(12) United States Patent
Chang et al.

(10) Patent No.: US 10,987,844 B1
(45) Date of Patent: Apr. 27, 2021

(54) CLAMPING MECHANISM ASSEMBLY

(71) Applicant: CORETECH SYSTEM CO., LTD., Zhubei (TW)

(72) Inventors: Yuing Chang, Zhubei (TW); Chih-Kang Lee, Zhubei (TW); Chia-Hsiang Hsu, Zhubei (TW); Rong-Yeu Chang, Zhubei (TW)

(73) Assignee: Coretech System Co., Ltd., Zhubei (TW)

( * ) Notice: Subject to any disclaimer, the term of this patent is extended or adjusted under 35 U.S.C. 154(b) by 0 days.

(21) Appl. No.: 17/039,460

(22) Filed: Sep. 30, 2020

Related U.S. Application Data

(60) Provisional application No. 62/912,754, filed on Oct. 9, 2019.

(51) Int. Cl.
| | |
|---|---|
| *B29C 45/77* | (2006.01) |
| *B29C 45/66* | (2006.01) |
| *B29C 45/17* | (2006.01) |
| *B29C 45/72* | (2006.01) |
| *B29C 45/78* | (2006.01) |

(52) U.S. Cl.
CPC .......... *B29C 45/77* (2013.01); *B29C 45/1747* (2013.01); *B29C 45/661* (2013.01); *B29C 45/72* (2013.01); *B29C 45/78* (2013.01); *B29C 2945/7604* (2013.01); *B29C 2945/76234* (2013.01); *B29C 2945/76531* (2013.01); *B29C 2945/76545* (2013.01)

(58) Field of Classification Search
CPC ... B29C 45/77; B29C 45/1747; B29C 45/661; B29C 45/72; B29C 45/78; B29C 2945/7604; B29C 2945/76234; B29C 2945/76531; B29C 2945/76545
USPC ........................................................ 425/143
See application file for complete search history.

(56) References Cited

U.S. PATENT DOCUMENTS

| | | | | |
|---|---|---|---|---|
| 1,149,518 A | * | 8/1915 | Holmes | B30B 15/04 100/214 |
| 3,733,669 A | * | 5/1973 | Coho | E01B 25/10 29/897 |
| 4,021,181 A | * | 5/1977 | Hehl | B29C 45/1747 425/450.1 |
| 4,345,890 A | * | 8/1982 | Hemmi | B22D 17/26 100/214 |

(Continued)

*Primary Examiner* — Matthew J Daniels
*Assistant Examiner* — Gregory Chad Grosso
(74) *Attorney, Agent, or Firm* — Muncy, Geissler, Olds & Lowe, P.C.

(57) ABSTRACT

The present disclosure provides a clamping assembly in operative connection with a mold of an injection-molding apparatus. The clamping assembly includes a fixed plate, a rear plate, a plurality of tie bars, a movable plate, a driving module, and a temperature adjuster. The rear plate is spaced apart from the fixed plate. The tie bars are interlinked with the fixed plate and the rear plate and provided with a plurality of channels. The movable plate, between the fixed plate and the rear plate, is capable of moving with respect to the fixed plate along the tie bars. The driving module interlinks the rear plate and the movable plate. The temperature adjuster is employed to supply a fluid into the channels to remove heat from the tie bars, thereby preventing non-uniform thermal expansion of the tie bars, and hence preventing the structural wear and flash issues.

20 Claims, 15 Drawing Sheets

(56) References Cited

U.S. PATENT DOCUMENTS

| | | | | |
|---|---|---|---|---|
| 4,768,559 A | * | 9/1988 | Hehl | G05D 23/1919 |
| | | | | 137/887 |
| 5,699,624 A | * | 12/1997 | Gaus | G01B 5/30 |
| | | | | 33/787 |
| 2005/0179157 A1 | * | 8/2005 | Muranaka | B29C 45/7306 |
| | | | | 264/40.6 |
| 2014/0242207 A1 | * | 8/2014 | Takatsugi | B29C 45/72 |
| | | | | 425/143 |

* cited by examiner

CLAMPING MECHANISM ASSEMBLY

TECHNICAL FIELD

The present disclosure relates to a mold-half transferring mechanism in an injection-molding apparatus, and more particularly, to a clamping assembly having a temperature-adjusting function for clamping a mold in the injection-molding apparatus.

DISCUSSION OF THE BACKGROUND

Injection molding is a process to rapidly create a mass quantity of identical plastic parts. The flexibility in shape and size achievable by the use of injection molding has expanded the limits of design in plastics and allowed substantial alternatives to traditional materials due to design freedom and weight reduction. Therefore, injection-molding techniques have been developed and applied in automotive components, consumer electronics, optics, medical products and daily necessities, among other areas.

This Discussion of the Background section is provided for background information only. The statements in this Discussion of the Background are not an admission that the subject matter disclosed in this Discussion of the Background section constitute prior art to the present disclosure, and no part of this Discussion of the Background section may be used as an admission that any part of this application, including this Discussion of the Background section, constitutes prior art to the present disclosure.

SUMMARY

One aspect of the present disclosure provides a clamping assembly. The clamping assembly, in operative connection with a mold of an injection-molding apparatus, includes a fixed plate, a rear plate, a plurality of tie bars, a movable plate, a driving module, and a temperature adjuster. The rear plate is spaced apart from the fixed plate, and the plurality of tie bars, interlinked with the fixed plate and the rear plate, are provided with a plurality of channels extending therethrough in a longitudinal direction. The movable plate is capable of moving with respect to the fixed plate along the tie bars, and the driving module interlinks the rear plate and the movable plate. The temperature adjuster is employed to supply a fluid into the channels to remove heat from the tie bars.

In some embodiments, the temperature adjuster includes a processor, a pump electrically coupled to the processor, a reservoir for storing the fluid, and a plurality of pipes, wherein the channels through the tie bars, the reservoir and the pump are interlinked with each other through the pipes, and the pump supplies the low-temperature fluid into the channels from the reservoir, thereby bringing the fluid-absorbing heat into contact with the tie bars.

In some embodiments, the temperature adjuster further comprises a plurality of coupling collars connecting intakes of the tie bars to the pipes communicating with the pump, and connecting outputs of the tie bars to the pipes communicating with the reservoir.

In some embodiments, the temperature adjuster further comprises a plurality of first sensors attached to surfaces of the tie bars and electrically coupled to the processor to monitor temperatures of the tie bars, wherein the processor is programmed to adjust a flow rate of the fluid to be fed into the channels based on monitoring results.

In some embodiments, the first sensors are further disposed in the pipes near the outputs of the tie bars for monitoring temperatures of the fluid passing through the channels.

In some embodiments, the temperature adjuster further includes at least one second sensor and a temperature regulator. The second sensor is located in the reservoir and electrically coupled to the processor for monitoring a temperature of the fluid in the reservoir, and the temperature regulator is disposed in the reservoir and electrically coupled to the processor. The processor is programmed to analyze a monitoring result provided by the second sensor and to control operations of the temperature regulator to change the temperature of the fluid in the reservoir based on the result of the analysis.

In some embodiments, the clamping assembly further includes an ejection cylinder mounted in and extending through the movable plate and configured to push a molded product out of the mold, wherein the driving module is configured to exert a force on the movable plate to push the movable plate toward the fixed plate and to pull the movable plate away from the fixed plate.

In some embodiments, the fluid enters the channels from a first end of the tie bar near the fixed plate and exits the channels from a second end near the rear plate.

In some embodiments, the temperature adjuster further includes a plurality of electric heaters attached to the fixed plate and the movable plate and electrically coupled to the processor.

One aspect of the present disclosure provides a clamping assembly. The clamping assembly, in operative connection with a mold of an injection-molding apparatus, includes a plurality of driving modules, a fixed plate, a movable plate, at least one linkage, a plurality of tie bars, and a temperature adjuster. The movable plate is spaced apart from the fixed plate for mounting the driving modules. The tie bars are interlinked with the driving modules and the linkage and penetrate through the movable plate, wherein at least one of the tie bars includes a hidden hole extending therethrough in a longitudinal direction. The temperature adjuster is employed to feed a fluid into the hidden hole to remove heat from the respective tie bar.

In some embodiments, the temperature adjuster includes a processor, a pump, a reservoir, at least one conduit, and a plurality of pipes. The pump is electrically coupled to the processor, and the reservoir contains the fluid. The conduit is received in the hidden hole and has a first channel extending through the conduit in a longitudinal direction, wherein an outer peripheral surface of the conduit and an inner peripheral surface of the respective tie bar collectively define a second channel communicating with the first channel. The reservoir, the first channel, the second channel, the reservoir and the pump are interlinked with each other through the pipes. The pump supplies the low-temperature fluid into the first and second channels from the reservoir, thereby bringing the fluid into contact with the tie bars for the purpose of absorbing heat from the tie bars.

In some embodiments, the fluid flows from the second channel to the first channel.

In some embodiments, the fluid flows from the first channel to the second channel.

In some embodiments, the temperature adjuster further includes at least one coupling collar for coupling the conduit and the respective tie bar to the pipes.

In some embodiments, the coupling collar contacts an end surface of the tie bar while a portion of the conduit extends into the coupling collar, and end surface of the tie bar is configured to press against at least one O-ring, such that the O-ring wraps around a passageway of the coupling collars tightly.

In some embodiments, the driving modules include a housing, a piston, a rod, a mortise lock and a bracket. The housing is mounted on the fixed plate, and the piston is received in the housing. The rod is connected to the piston, and the mortise lock connects the tie bar to the rod. The bracket penetrates through the fixed plate and is employed to position the rod and the mortise lock.

In some embodiments, the mortise lock is housed in the bracket and includes a main annulus and a plurality of annulus sectors, equiangularly spaced apart from each other, connected to an inner peripheral surface of the main annulus.

One aspect of the present disclosure provides a clamping assembly. The clamping assembly, in operative connection with a mold of an injection-molding apparatus, includes at least one driving module, a fixed plate, a movable plate, a plurality of tie bars, and a plurality of temperature-controlling modules. The movable plate is spaced apart from the fixed plate. The plurality of tie bars penetrate through the movable plate and are coupled to the fixed plate, wherein the movable plate is advanced to and retracted from the fixed plate along the tie bars by operation of the driving module. The plurality of temperature-controlling modules are configured to wrap around portions of the tie bars to adjust a temperature of the tie bars.

In some embodiments, a length of the temperature-controlling modules between the fixed plate and the movable plate is less than a minimum mold height.

In some embodiments, the temperature adjuster circulates a fluid into the temperature-controlling modules via a plurality of pipes.

With the above-mentioned configurations of a clamping assembly, the heat transferred to the tie bars from the fixed and movable plates can be effectively adjusted to prevent non-uniform thermal expansion issues, and hence avoid structural wear issues.

The foregoing has outlined rather broadly the features and technical advantages of the present disclosure in order that the detailed description of the disclosure that follows may be better understood. Additional features and technical advantages of the disclosure are described hereinafter, and form the subject of the claims of the disclosure. It should be appreciated by those skilled in the art that the concepts and specific embodiments disclosed may be utilized as a basis for modifying or designing other structures, or processes, for carrying out the purposes of the present disclosure. It should also be realized by those skilled in the art that such equivalent constructions do not depart from the spirit or scope of the disclosure as set forth in the appended claims.

BRIEF DESCRIPTION OF THE DRAWINGS

A more complete understanding of the present disclosure may be derived by referring to the detailed description and claims. The disclosure should also be understood to be coupled to the figures' reference numbers, which refer to similar elements throughout the description.

DETAILED DESCRIPTION

Figure 1:
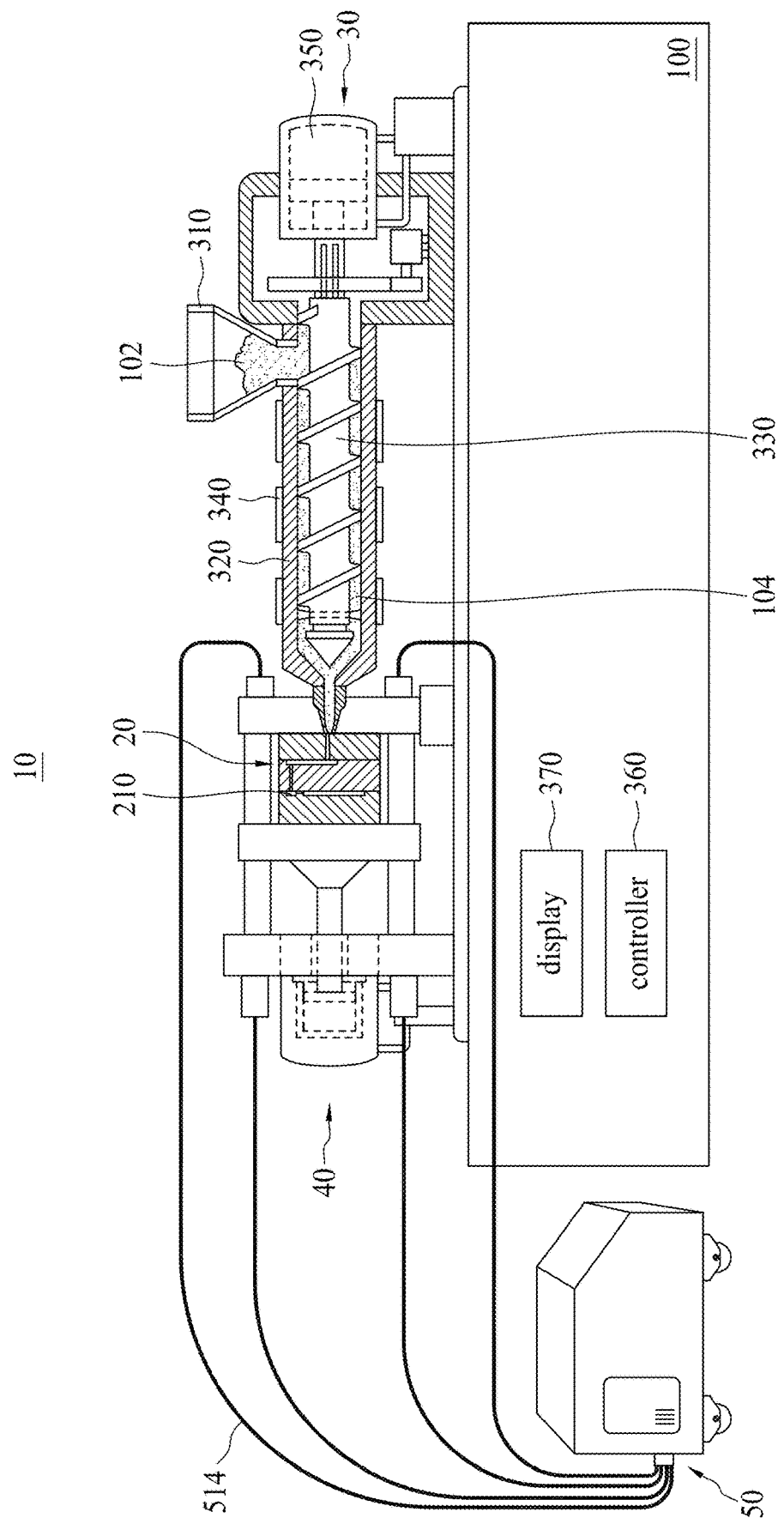
FIG. 1 is a schematic view of an injection-molding apparatus in accordance with some embodiments of the present disclosure.

Embodiments, or examples, of the disclosure illustrated in the drawings are described below using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting to the present inventive concept. As used herein, the singular forms "a," "an" and "the" are intended to include the plural forms as well, unless the context clearly indicates otherwise. It shall be understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

FIG. 1 is a schematic view of an injection-molding apparatus 10 in accordance with some embodiments of the present disclosure. Referring to FIG. 1, the injection-molding apparatus 10 that can be used to carry out molding includes a mold 20, an injection device 30 that injects melted plastic 104 to fill a mold cavity 210 inside the mold 20, and a clamping assembly 40 that supports the mold 20. More particularly, the injection device 30 is used for heating solid plastic (such as plastic granules) 102, in a hopper 310, to a melted state and injecting the melted plastic 104 to fill the mold cavity 210; the clamping assembly 40 is employed to perform a mold-opening and mold-closing operation and a mold-clamping operation to keep the mold 20 securely closed. The injection-molding apparatus 10 can further include a pedestal 100 for carrying the injection device 30 and the clamping assembly 40.

The injection device 30 includes a barrel 320 in which solid plastic 102 is melted and a screw 330 is disposed. When the solid plastic 102 enters the barrel 320 through the hopper 310 installed on the barrel 320 and communicating with a space inside the barrel 320, the solid plastic 102 is changed into the melted state due to the shear stress effect and heat provided by a plurality of heat bands 340 outside the barrel 320. Specifically, a rotation of the screw 330 in the barrel 320 generates the shear stress effect with the barrel 320 to squeeze the solid plastic 102, causing a large amount of heat to be generated through friction to change some of the solid plastic 102 into melted plastic 104. The rotation of the screw 330 also feeds the melted plastic 104 into an accumulation zone collectively defined by the barrel 320 and the tip of the screw 330. The heat bands 340, spaced evenly around a circumference of the barrel 320, can provide thermal energy to heat the remaining solid plastic 102 to a temperature at which the solid plastic 102 becomes flowable (i.e., soft and deformable). The thermal energy provided by the heat bands 340 also serves to maintain the temperature of the melted plastic 104 accumulating in the front of the barrel 320. In detail, the thermal energy generated by the heat bands 340, located outside the barrel 320, may be conducted through the barrel 320 to heat the remaining solid plastic 102 and radiates into the accumulation zone where the melted plastic 104 is received, in order to maintain the temperature of the melted plastic 104. The heat bands 340 may generate different thermal energies via electrical inductance or microwave or ultrasonic energy. For example, to make sure the melted material 104 is injected smoothly, the thermal energy generated by the heat bands 340 increases as the distance from the mold 20 decreases. In some embodiments, one or more heaters may be placed in the screw 330 to assist in conduction of heat to the solid plastic 102 and the melted plastic 104 inside the barrel 320.

Once the melted plastic 104 accumulating in front of the screw 330 reaches a predetermined volume, the screw 330 stops rotating and is driven backward to its injection position. Next, the screw 330 is provided high pressure to forcefully inject the melted plastic 104 into the closed mold cavity 210 inside the mold 20, wherein the high pressure applied to the screw 330 for injection may be provided by a driving motor 350 disposed at a rear end of the barrel 320, wherein the rear end of the barrel 320 is distal from the mold 20. The driving motor 350 can be a hydraulic motor, an electric servo motor, or a hydraulic-electric hybrid motor.

The injection-molding apparatus 10 can further include a controller 360 configured to control the production of molded products. More particularly, the controller 360 is employed to monitor real-time conditions, including pressures and temperatures, using multiple detectors (not shown) disposed at different portions of the injection-molding apparatus 10. In operation, information associated with the conditions measured by the detector is transmitted to the controller 360, which executes real-time and/or post-molding analyses to predict quality of the molded products. The controller 360 is programmed to control operation of the driving motor 350, which in turn controls a rotation and a reciprocal movement of the screw 330. The controlled 360 is also programmed to control operation of the heat bands 340 based on the analyzed results, which in turn control, the temperature of the melted plastic 104 in the barrel 320 and ahead of the screw 330. The controller 360 may be further programmed to alert on-site technicians of machine malfunctions, such as when the pressure in the barrel 320 drops below a particular value relative to a target pressure, or even shut down the injection device 30 or the clamping assembly 40.

The injection-molding apparatus 10 can further include a display 370 for displaying, to on-site technicians, data related to the performance and operation of the injection-molding apparatus 10. The display 370 may be further configured to accept input data from the on-site technicians. In other words, the display 370 is provided with a communications link directly to the controller 360 to provide real-time control of the injection-molding apparatus 10 by the on-site technicians, particularly where the on-site technicians' intervention is required.

Figure 2:
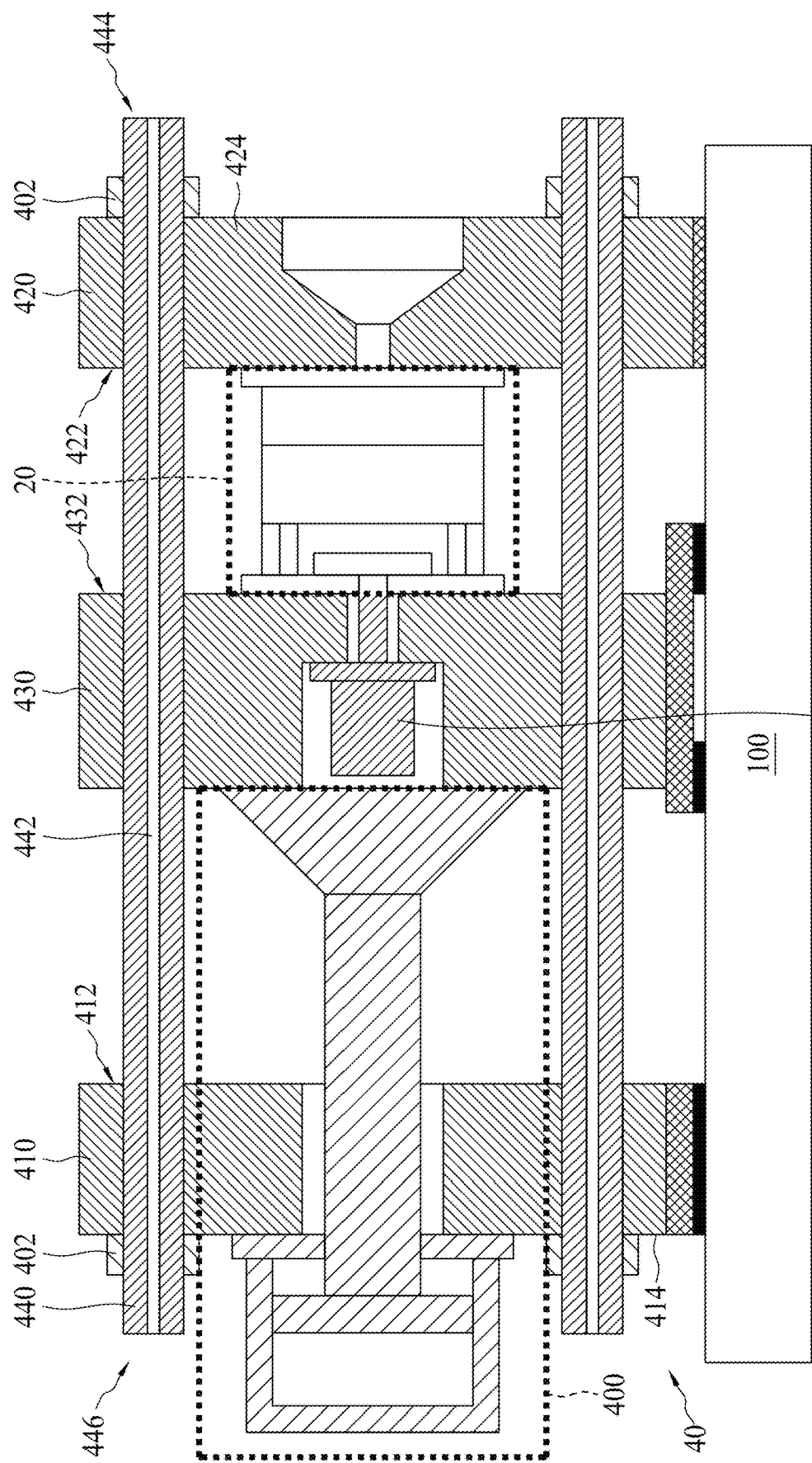
FIG. 2 is a cross-sectional view of a clamping assembly in accordance with some embodiments of the present disclosure.

FIG. 2 is a cross-sectional view of the clamping assembly 40 in accordance with some embodiments of the present disclosure. Referring to FIG. 2, the clamping assembly 40, which mainly functions for closing and opening the mold 20, includes a rear plate 410 and a fixed plate 420 placed on the pedestal 100 and separated from each other, and a movable plate 430 capable of moving with respect to the fixed plate 420. The clamping assembly 40, under control of the controller 360 (shown in FIG. 1), further includes a plurality of tie bars 440, for example, four tie bars; the rear plate 410 and the fixed plate 420 are interlinked by the tie bars 440, and the movable plate 430 is advanced to and retracted from the fixed plate 420 along the tie bars 440 by operations of a driving module 400 to perform mold closing, mold clamping and mold opening. The space between the tie bars 440 limits the size of the mold 20 that can be placed in the injection-molding apparatus 10, so that the tie bars 440 are usually arranged at the corners of the rear plate 410, the fixed plate 420 and the movable plate 430. More particularly, the tie bars 440 are inserted into respective insertion holes 412, 422, 432 formed in and arranged at corners of the rear plate 410, the fixed plate 420, and the movable plate 430, first ends 444 of the tie bars 440 are fixed on a front surface 424 of the fixed plate 420 by fixing nuts 402, and second ends 446 of the tie bars 440 are fixed on a back surface 414 of the rear plate 410 by the fixing nuts 402.

Figure 3:
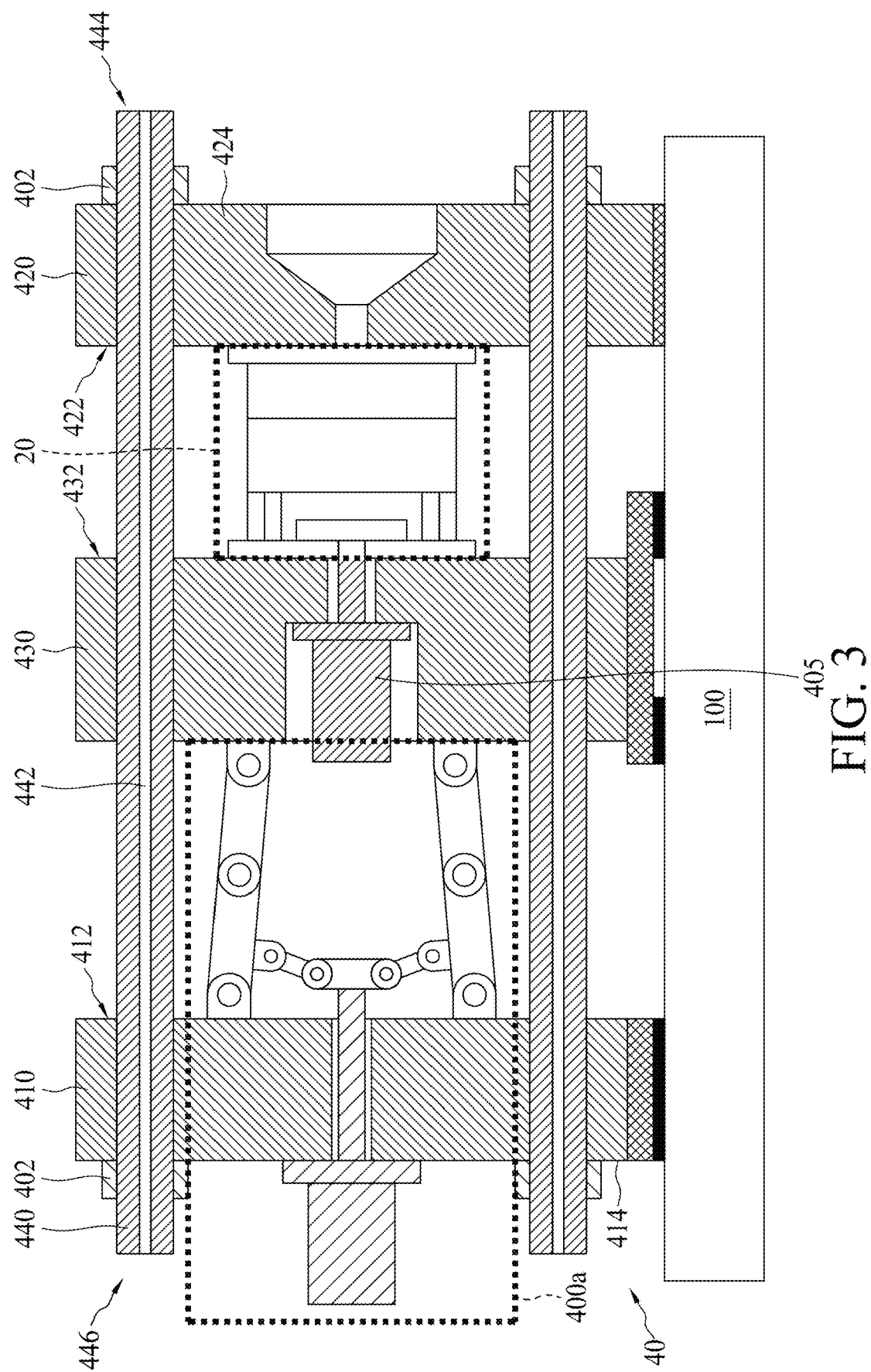
FIG. 3 is a cross-sectional view of a clamping assembly in accordance with some embodiments of the present disclosure.

The mold 20 can include at least two mold halves 220 and 230, one of which is secured on the movable plate 430, while the other is affixed to the fixed plate 420 in any suitable manner, wherein the mold cavity 210, as shown in FIG. 1, for receiving the melted plastic 104, is formed once the mold half 230 on the movable plate 430 comes into contact with the mold half 220 on the fixed plate 420, proximal to the barrel 310. The driving module 400 can exert a force on the movable plate 430 to push the movable plate 430 toward the fixed plate 420 and to pull the movable plate 430 away from the fixed plate 420 during operations. In addition, the driving module 400 can provide a clamping force on the movable plate 430 to hold the complementary mold halves 220 and 230 tightly together while the injection of the melted plastic 104 into the mold 20 is taking place, thereby preventing the flash issue. In FIG. 2, the driving module 400 is a hydraulic cylinder holding the mold closed; however, in some embodiments, the driving module 400 can be a toggle mechanism for toggle clamping the mold 20, as shown in FIG. 3.

Referring to FIGS. 1 and 2, in operation, the driving module 400 initially pushes the mold halves 220 and 230 together and exerts sufficient pressure to keep the mold 20 securely closed. The barrel 320 subsequently moves toward the fixed plate 420 until a passageway is created for delivering the melted plastic 104 from an outlet of the barrel 320 to a melt inlet of the mold cavity 210. Next, the driving motor 350 is actuated to move the screw 330 toward the mold 20, thereby forcefully injecting the melted plastic 104 into the mold cavity 210, wherein the movement of the screw 330 controls the volume of the melted plastic 104 to be injected into the mold cavity 210. Once the melted plastic 104, in the mold 20, is cooled down enough to form solid plastic (i.e., the molded product), the pressure provided by the driving module 400 and applied to the mold 20 to keep the mold 20 closed is released, and hence the mold 20 is opened and the molded product is ejected. The molded product can be ejected by an ejection cylinder 405 mounted in and extending through the movable plate 430. The ejection cylinder 405, under control of the controller 360, may have one or more ejection pins to push the molded product out of the mold 20.

Notably, once the injection device 30 comes into contact with the mold half 220, the heat generated by the heat bands 340 and conducted to the barrel 320 is transferred by conduction and radiation to the mold half 220 and hence the fixed plate 420. In addition, the heat carried by the melted plastic 104 is transferred by convection to the mold halves 220 and 230, and hence conducted to the fixed plate 420 and movable plate 430 from the mold 20. In some embodiments, the front of the barrel 320 may contact the fixed plate 420 after the connection of the mold 20 and the injection device 30 is built; in such embodiments, heat from the barrel 320 is directly conducted to the fixed plate 420.

The heat transferred and radiated to the fixed plate 420 and movable plate 430 in the manners mentioned above is then conducted to the tie bars 440 that have the same diameter through their length prior to connecting the injection device 30 to the mold 20. The heat conducted to the tie bars 440 from the fixed plate 420 and the movable plate 430 may cause non-uniform thermal expansion of the tie bars 440, and therefore the fixed plate 420 and movable plate 430 may not be able to contact completely and the melted plastic 104 may spill outside the mold cavity 210, thereby generating flash. Additionally, the movable plate 430 cannot be smoothly advanced to and retracted from the fixed plate 420 once the tie bars 440 have the non-uniform thermal expansion issue. As a result, structural wear of the tie bars 440 may occur.

In order to prevent the non-uniform thermal expansion issue, a channel 442 is provided within each tie bar 440 through which a fluid flows to remove heat from the tie bars 440. The channel 442 extends through the tie bar 440 along its longitudinal direction, so that the fluid may enter the channel 442 from the first end 444 of the tie bar 440 and exit the channel 442 from the second end 446 of the tie bar 440. As the fluid, supplied by a temperature adjuster 50 shown in FIG. 1, passes through the channels 442 of the tie bars 440, the heat in the tie bars 440 is transferred to the fluid, thereby increasing the temperature of the fluid and transferring heat away from the tie bars 440.

Figure 4:
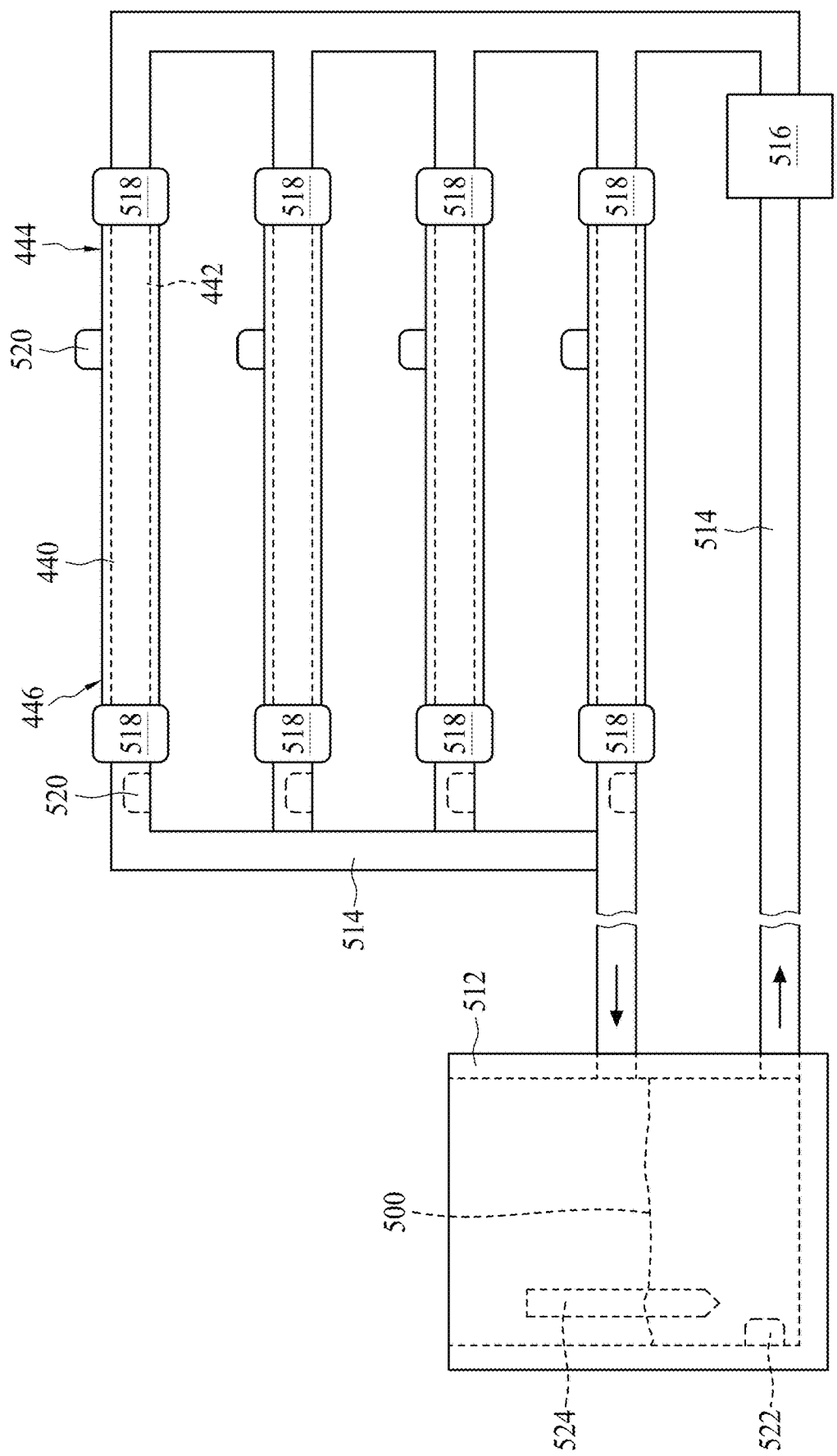
FIG. 4 is a schematic view of a portion of a temperature adjuster for circulating a fluid into channels provided within tie bars in accordance with some embodiments of the present disclosure.
Figure 5:
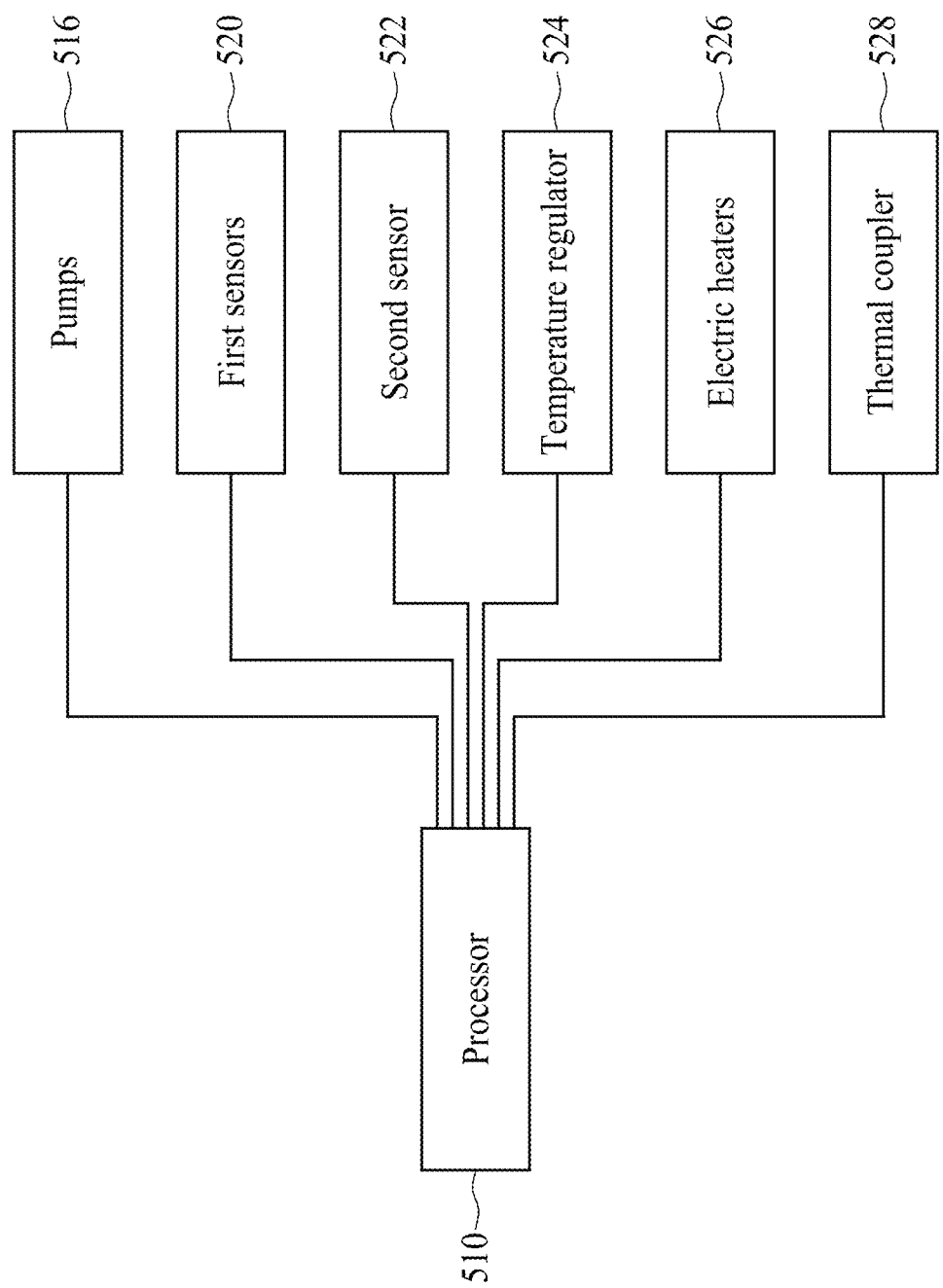
FIG. 5 is a circuit block diagram of the temperature adjuster in accordance with some embodiments of the present disclosure.

FIG. 4 is a schematic view of a portion of the temperature adjuster 50 for circulating a fluid 500 into the channels 442 of the tie bars 440 in accordance with some embodiments of the present disclosure, and FIG. 5 is a circuit block diagram of the temperature adjuster 50 in accordance with some embodiments of the present disclosure. The temperature adjuster 50 is configured to control temperatures at different locations of the clamping assembly 40, thereby preventing the tie bars 440 from undergoing non-uniform thermal expansion. Referring to FIGS. 4 and 5, the temperature adjuster 50 can include a processor 510, a reservoir 512, a plurality of pipes 514, and one or more pumps 516 for circulating the fluid 500, contained in the reservoir 512, into the channels 442 to remove heat transferred to the tie bars 440 from the fixed plate 420 and the movable plate 430.

The channels 442, the reservoir 512 and the pump 516 are interlinked with each other through the pipes 514. In some embodiments, the temperature adjuster 50 further includes a plurality of coupling collars 518 that connect intakes of the tie bars 440 and the pipes 514 to the pump 516 and connect outputs of the tie bars 440 and the pipes 514 to the reservoir 512. After securing the pipes 514 to the tie bars 440, the pump 516, electrically coupled to the processor 510, supplies the low-temperature fluid 500 into the channel 442 from the reservoir 512, thereby bringing the fluid 500 into contact with the tie bars 440 to transfer the heat from the tie bars 440 to the reservoir 512, thereby cooling the tie bars 440.

The temperature-controlling device 50 can further include a plurality of first sensors 520 electrically coupled to the processor 510 and employed to directly monitor temperatures of the tie bars 440 and/or the fluid 500 and provide corresponding sensed results to the processor 510. The first sensors 520 may be thermal couplers and can be attached to surfaces of the tie bars 440 for sensing temperatures of the tie bars 440. In order to monitor real-time temperatures of the tie bars 440, the first sensors 520 attached to the tie bars 440 may be located, for example, between the fixed plate 420 and the movable plate 430 where a large amount of heat accumulates during the injection of the melted material 104 into the mold cavity 210. Additionally or alternatively, the first sensors 520 may be located in the pipes 514 near the outputs of the channels 443 for sensing the temperatures of the fluid 500 passing through the channels 442.

During operation, information associated with conditions measured by the first sensors 520 is transmitted to the processor 510, which performs real-time analysis. The processor 510 is configured to control operations of the pump 516 to adjust a flow rate of the fluid 500 to be fed into the channels 442 based on results of the analysis. Notably, if a number of the pumps 516 in the temperature adjuster 50 is less than a number of the channels 442 extending through the tie bars 440 for conducting the fluid 500, the processor 510 is programmed to control operations of the pumps 514 to adjust the flow rate of the fluid 500 into the channels 442 based on the highest sensed temperature, thereby preventing the tie bars 440 from undergoing non-uniform thermal expansion.

Figure 6:
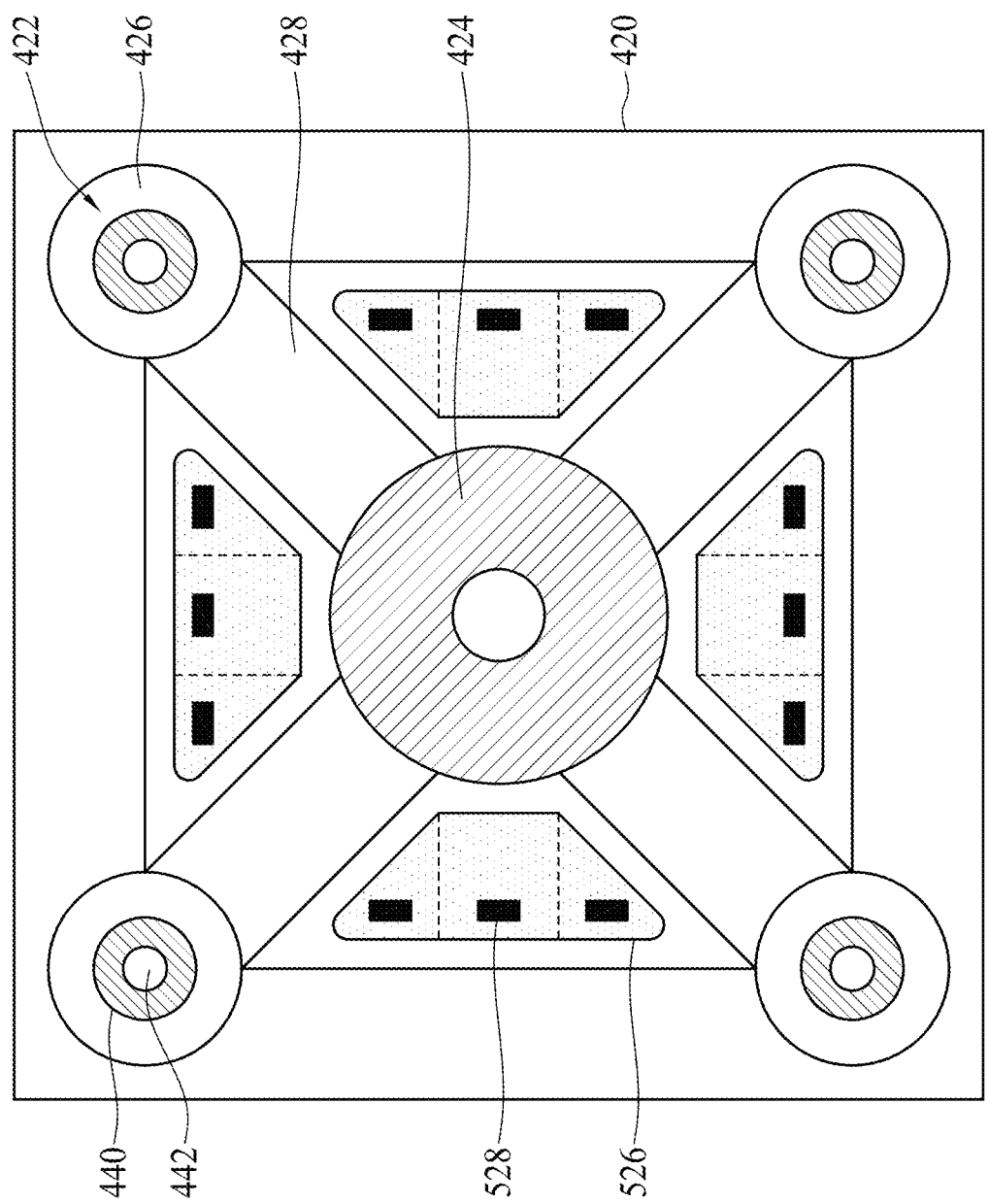
FIG. 6 is a schematic view of another portion of the temperature adjuster for circulating the fluid into channels provided within a fixed plate in accordance with some embodiments of the present disclosure.

The temperature adjuster 50 may further include a second sensor 522 located within the reservoir 512 to monitor the temperature of the fluid 500 in the reservoir 512 and transmit monitoring results to the processor 510. Additionally, the second sensor 522 may be employed to monitor the volume of the fluid 500 in the reservoir 512. In some embodiments, the temperature adjuster 50 can further include a temperature regulator 524 partially immersed in the fluid 500 in the reservoir 512. The temperature regulator 524, under control of the processor 510, is configured to regulate the temperature of the fluid 500 in the reservoir 512. The processor 510 may be programmed to control operations of the temperature regulator 524 to decrease or increase the temperature of the fluid in the reservoir 512 based on the monitoring results provided by the second sensor 522. The processor 510 may be programmed to alert on-site technicians or shut down the pump 516, and hence shut down the injection-molding apparatus 10 when the temperature of the fluid 500 in the reservoir 512 is greater than a preset threshold or the fluid levels in the reservoir 512 are lower than a desired level Referring to FIG. 6, the fixed plate 420 includes a first annular rib 424 provided at the center of the fixed plate 420 to allow the barrel 320, shown in FIG. 1, to enter thereto and exit therefrom, a plurality of second annular ribs 426 provided at corners of the fixed plate 420 and enclosing the insertion holes 422 to allow the tie bars 440 to enter thereto and exit therefrom, and a plurality of reinforcing ribs 428 radially connecting the first annular rib 424 to the second annular ribs 426 for reducing the deformation of the fixed plate 420 while the clamping force, supplied by the driving module 400, is exerted thereon.

In some embodiments, the temperature adjuster 50 can further include a plurality of electric heaters 526 attached to the rear plate 410, the fixed plate 420 and the movable plate 430 and electrically coupled to the processor 510. Optionally, multiple thermal couplers 528, under control of the processer 510, are placed on the electric heaters 526 for monitoring temperatures of the electric heater 526. For example, in FIG. 6, the electric heaters 526 are placed at locations where the first annular rib 424, the second annular ribs 426, and the reinforcing ribs 428 are not disposed. The processor 510 is configured to adjust thermal energies generated by the electric heaters 526 based on monitoring results provided by the thermal couplers 528 and the fluid 500 through the tie bars 440 while the injection of the melted plastic 104 into the mold 20 is taking place; hence, the non-uniform thermal expansion of the tie bars 440 can be effectively prevented, thereby achieving consistent and reliable molded products.

Figure 7:
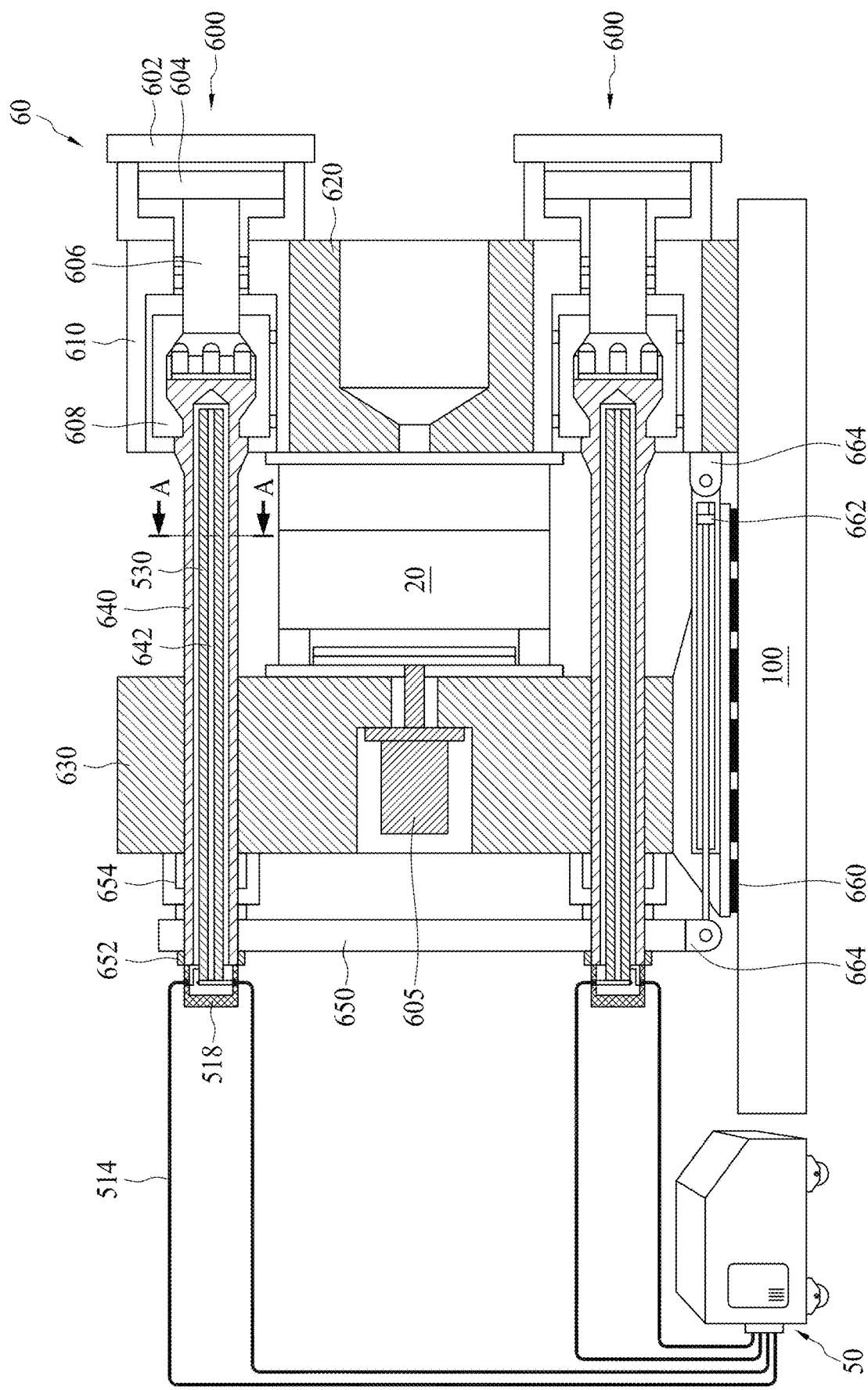
FIG. 7 is a cross-sectional view of a clamping assembly in accordance with some embodiments of the present disclosure.

FIG. 7 is a cross-sectional view of a clamping assembly 60 in accordance with some embodiments of the present disclosure. Referring to FIG. 7, the clamping assembly 60 is in operative connection with a mold 20 of an injection-molding apparatus 10 as shown in FIG. 1. More particularly, the clamping assembly 60, disposed on a pedestal 100 of the injection-molding apparatus 10, is employed not only to perform mold-opening and mold-closing operations, but also to perform a mold-clamping operation to keep the mold 20 securely closed while the injection of melted plastic 104 into the mold 20 is taking place.

Referring again to FIG. 7, the clamping assembly 60 includes a plurality of driving modules 600, a fixed plate 620 disposed on the pedestal 100 for mounting the driving modules 600, a movable plate 630 spaced away from the fixed plate 620, a plurality of tie bars 640 coupled to the driving modules 600 and penetrating through the movable plate 630, and one or more linkages 650 mounted on the movable plate 630 and interlinked with the tie bars 640. The movable plate 630, between the fixed plate 620 and the linkages 650, is advanced to and retracted from the fixed plate 620 along the tie bars 640 by interactions of the driving modules 600 and the linkages 650 to perform mold closing, mold clamping and mold opening. In some embodiments, an anti-wear sheet 660 may be placed on the pedestal 100 and in a movement zone of the movable plate 630.

Figure 8:
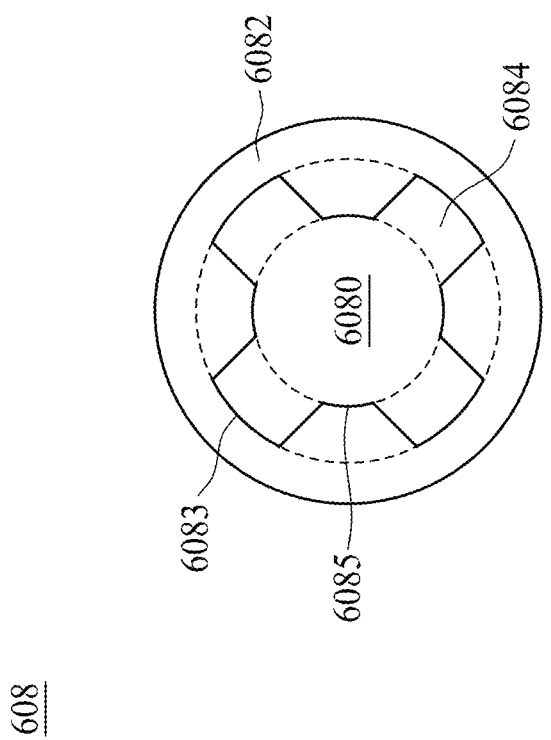
FIG. 8 is a plan view of a mortise lock in accordance with some embodiments of the present disclosure.

The driving modules 600 may comprise hydraulic cylinders and include a housing 602 mounted on the fixed plate 620, a piston 604 received in the housing 602, a rod 606 connected to the piston 604, a mortise lock 608 connecting the tie bar 640 to the rod 606, and a bracket 610 mounted in or on the fixed plate 620 and employed to position the rod 606 and the mortise lock 608. As shown in FIG. 7, the mortise lock 608 can be housed in the bracket 610. The mortise lock 608 has a substantially cross-shaped aperture 6080, as shown in FIG. 8, extending through the center of the mortise lock 608. In some embodiments, the mortise lock 608 may include a main annulus 6082 and a plurality of annulus sectors 6084 connected to an inner peripheral surface 6083 of the main annulus 6082, wherein the annulus sectors 6084 are equiangularly spaced apart from each other. After the rod 606 and the tie bar 640 are assembled with the mortise lock 608, outer peripheries of the rod 606 and the tie bar 640 may contact the inner peripheral surfaces 6085 of the annulus sectors 6084. In some embodiments, the rods 606 and the tie bars 640 can be respectively inserted into the mortise lock 608 and then the mortise lock 608 may rotates for a preset angle for engaging ribs provided on the rods 606 and the tie bars 640 with the annulus sectors 6084.

Referring back to FIG. 7, the tie bars 640 are fixed on the linkage 650 by fixing nuts 652, and the linkages 650 are mounted on the movable plate 630 by coupling members 654, for example. The clamping assembly 60 can further include one or more auxiliary cylinder 662 mounted on the fixed plate 620 and lower ends of the linkages 650 via coupling blocks 664 for rapidly and smoothly opening and closing the mold 20.

Figure 9:
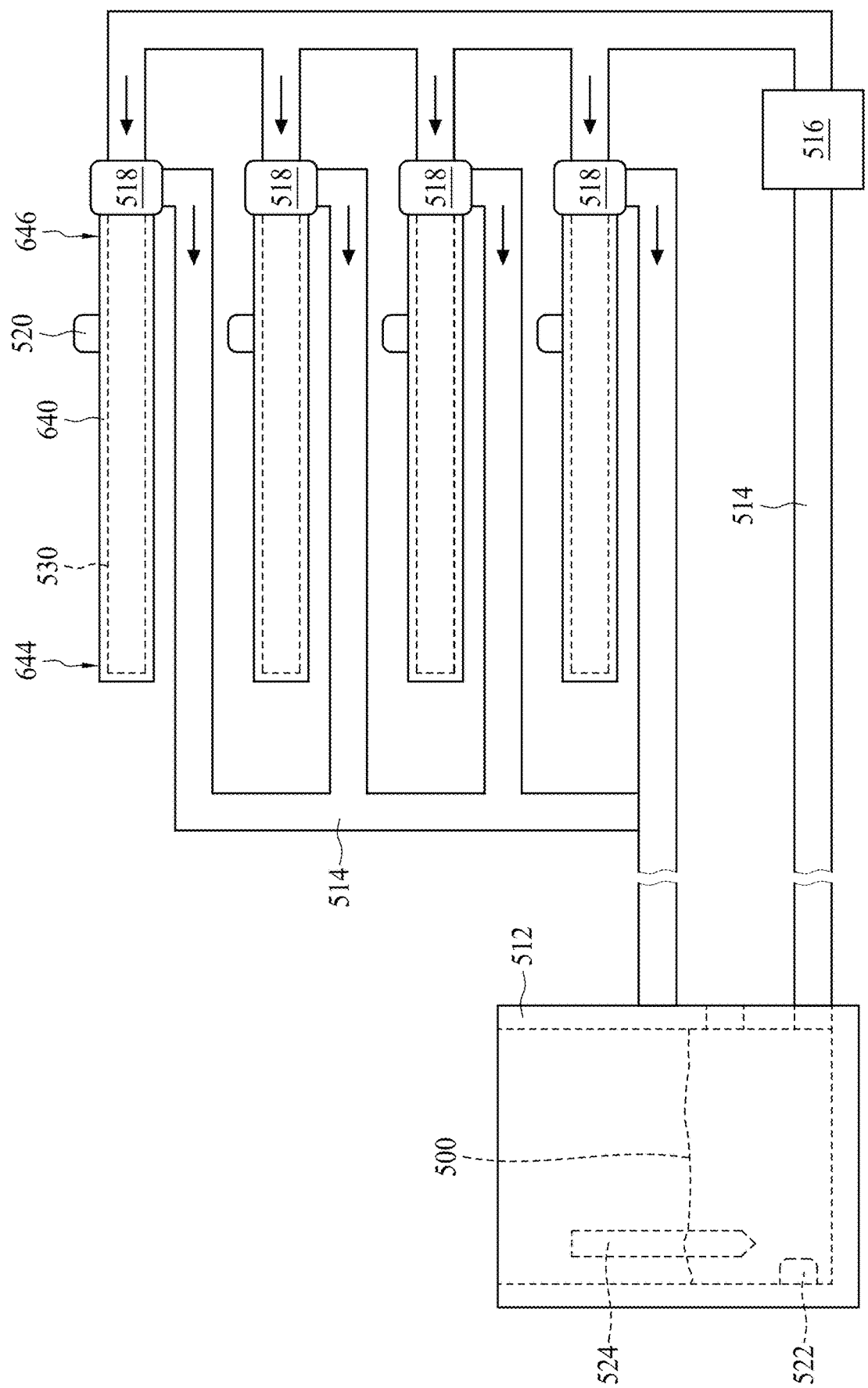
FIG. 9 is a schematic view of a portion of a temperature adjuster for circulating a fluid into tie bars in accordance with some embodiments of the present disclosure.

Each tie bar 640 is provided with a hidden hole 642, in which a fluid, supplied by a temperature adjuster 50 as shown in FIG. 7, flows to remove heat transferred to the tie bars 640 from the fixed plate 620 and the movable plate 630. FIG. 9 is a schematic view of a portion of the temperature adjuster 50 for circulating a fluid 500 into the tie bars 640 in accordance with some embodiments of the present disclosure. Referring to FIGS. 7 and 9, the temperature adjuster 50 is configured to control temperatures at different portions of the clamping assembly 60, thereby preventing the tie bars 640 from undergoing non-uniform thermal expansion. The temperature adjuster 50 includes a processor 510, a reservoir 512, a plurality of pipes 514, one or more pumps 516, and a plurality of conduits 530 that collectively circulate the fluid 500, contained in the reservoir 512, into the hidden holes 642 in the tie bars 640 to remove heat transferred to the tie bars 640 from the fixed plate 420 and the movable plate 430.

Figure 10:
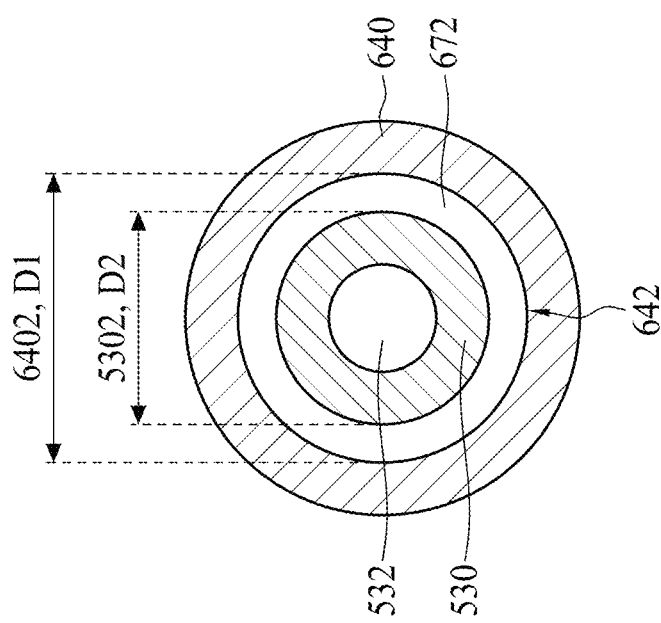
FIG. 10 is a cross-sectional view taken along a line A-A in FIG. 7.

FIG. 10 is a cross-sectional view taken along a line A-A in FIG. 7. Referring to FIG. 10, the conduits 530 are disposed in respective hidden holes 642 in the tie bars 640. Each conduit 530, coaxially with the hidden hole 642 drilled in the tie bar 640, has a first channel 532 penetrating therethrough. The hidden hole 642, defined by an inner peripheral surface 6402 of the tie bar 640, has a first diameter D1; the conduit 530 has a second diameter D2, defined by an outer peripheral surface 5302 thereof, less than the first diameter D1. The inner peripheral surface 6402 of the tie bar 640 is spaced away from the outer peripheral surface 5302 of the conduit 530 to define a second channel 672 communicating with the first channel 532 and through which the fluid 500 flows to remove heat from the tie bars 640. In some embodiments, a cross-sectional area of the first channel 532 is designed to be substantially equal to a cross-sectional area of the annulus-shaped second channel 672, so that the (pressured) fluid 500 can flow smoothly through the first channel 532 and the second channel 672. Accordingly, each tie bar 640 is cooled by the fluid 500 and flows through the first channel 532 and the second channel 672.

Referring again to FIG. 9, the tie bars 640, the reservoir 512 and the pump 516 are interlinked with each other through the pipes 514. First ends 644 of the tie bars 640 are clamped by the mortise locks 608, and the fluid 500 is brought into contact with the tie bars 640 and the conduits 530 from second ends 646 of the tie bars 640. The tie bar 640 and the conduit 530 can be interlinked with the pipes 514 by a coupling collar 518. After securing the pipes 514 to the tie bars 640 and conduits 530 by the coupling collars 518, the pump 516, under control of the processor 510, drives the low-temperature fluid 500 into the first channels 532 and second channels 672 from the reservoir 512 to absorb heat from the tie bars 640.

Figure 11:
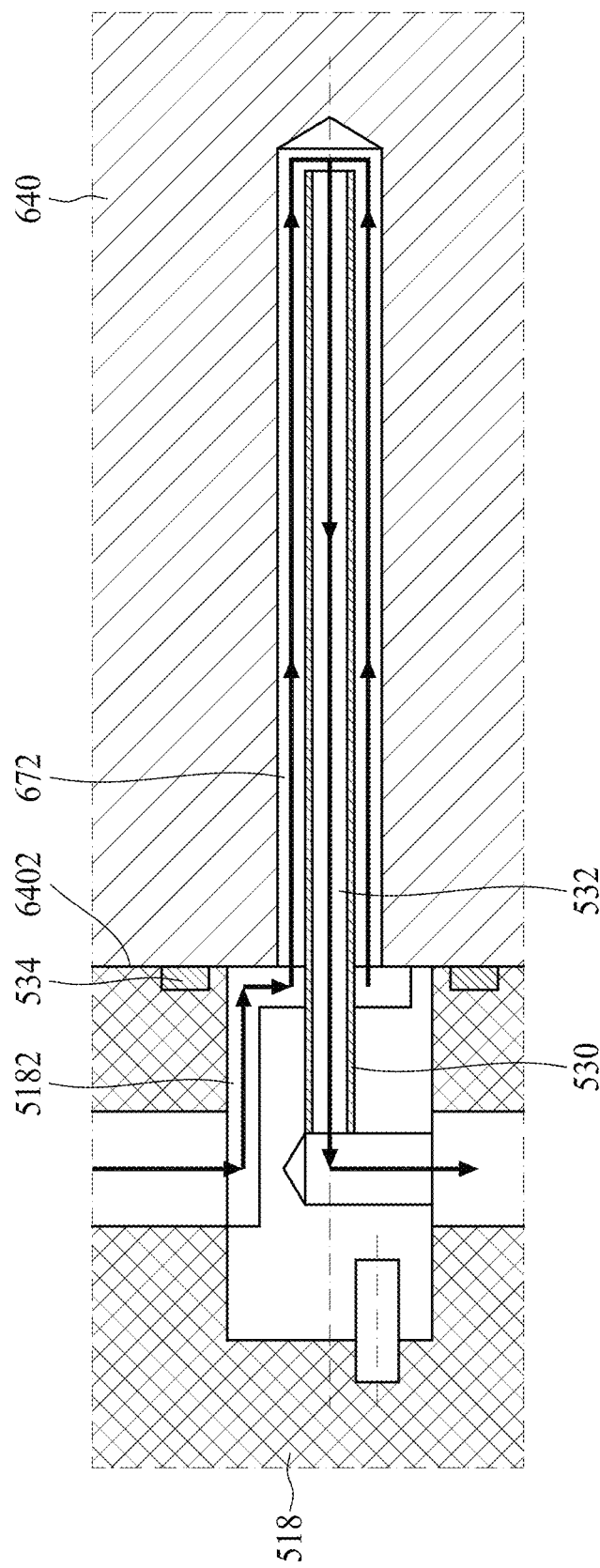
FIGS. 11 and 12 are schematic views illustrating a direction of a flowing fluid.
Figure 12:
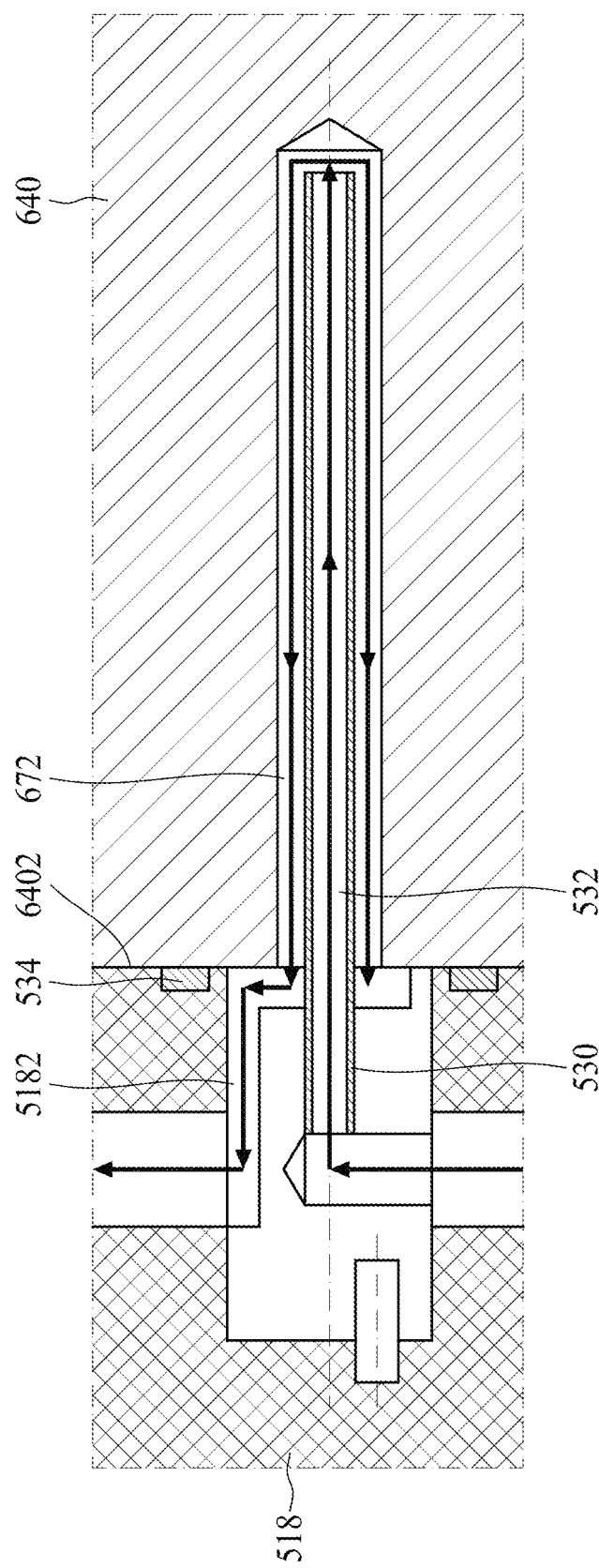

Because the lower-temperature fluid 500 can absorb more heat, and the heat in the tie bars 640 can be transferred to the conduits 530 once the fluid 500 fills the second channels 672, the coupling collars 518 are designed to guide the fluid 500 from the second channel 672 to the first channel 532, as shown in FIG. 11, to rapidly remove heat from the tie bars 640. Alternatively, the coupling collars 518 may be designed to guide the fluid 500 to flow from the first channels 532 to the second channels 672 to cool the tie bars 640, as shown in FIG. 12. In FIGS. 11 and 12, the coupling collars 518 contacts an end surface 6402 of the tie bars 640 and a portion of the conduit 530 extends into the coupling collars 518; the end surface 6402 of the tie bar 640 may be configured to press against an O-ring 534, such that the O-ring 534 wraps arounds a passageway 5182 of the coupling collars 518 tightly, wherein the passageway 5182 communicates with the second channel 672.

Referring again to FIG. 9, in operation, the pump 516 can adjust a flow rate of the fluid 500 to be fed into the first channels 532 and the second channels 672 based on monitoring results provided by temperature sensors, including a plurality of first sensors 520 attached to the tie bars 640 and a second sensor 522 in the reservoir 512. Notably, the connection of the processor 510, the pump 516, the first sensors 520, and the second sensor 522 for cooling the tie bars 640 can be the same as the connection of the processor 510, the pump 516, the first sensors 520 and the second sensor 522 applied to cool the tie bars 440 shown in FIG. 5. Referring to FIGS. 5 and 9, the processor 510 may analyze information associated with conditions provided by the first sensors 520 and the second sensor 522 and may be configured to control operations of the pump 516 to adjust the flow rate of the fluid 500 to be fed into the first channels 532 and the second channels 672 based on analyzed results, thereby preventing the tie bars 440 from undergoing non-uniform thermal expansion.

Figure 13:
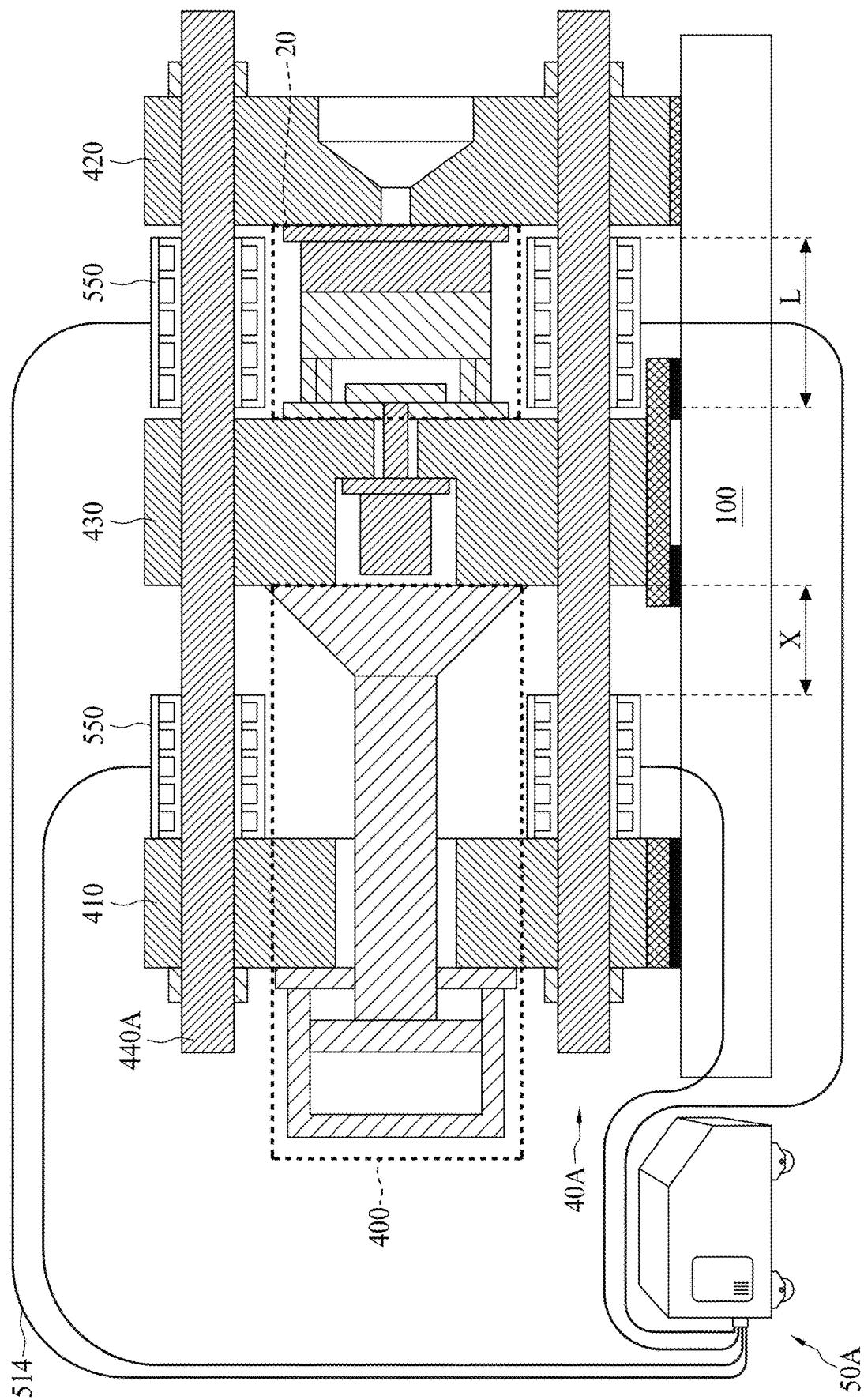
FIGS. 13 to 15 are schematic views of clamping assemblies in accordance with some embodiments of the present disclosure.
Figure 14:
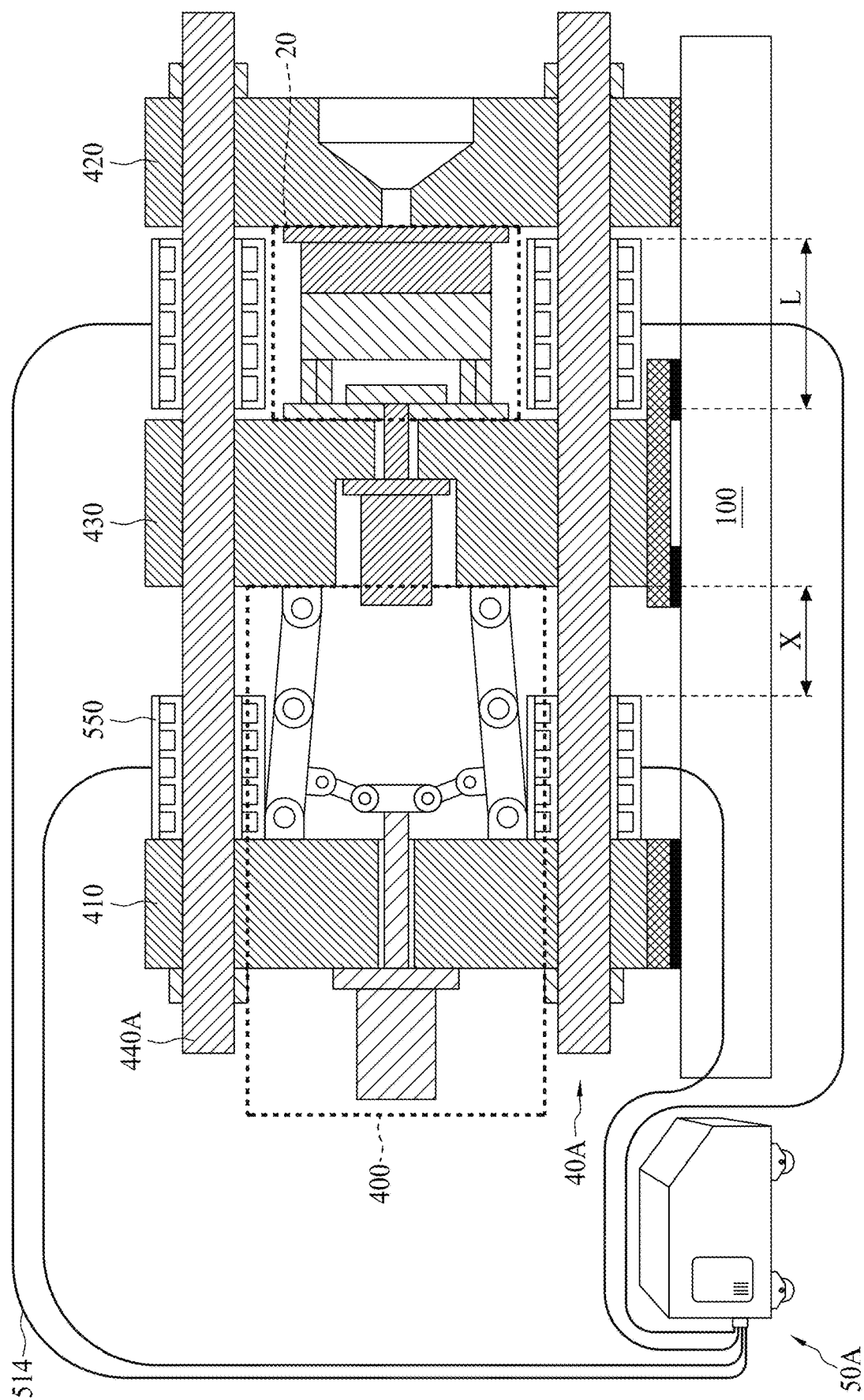
Figure 15:
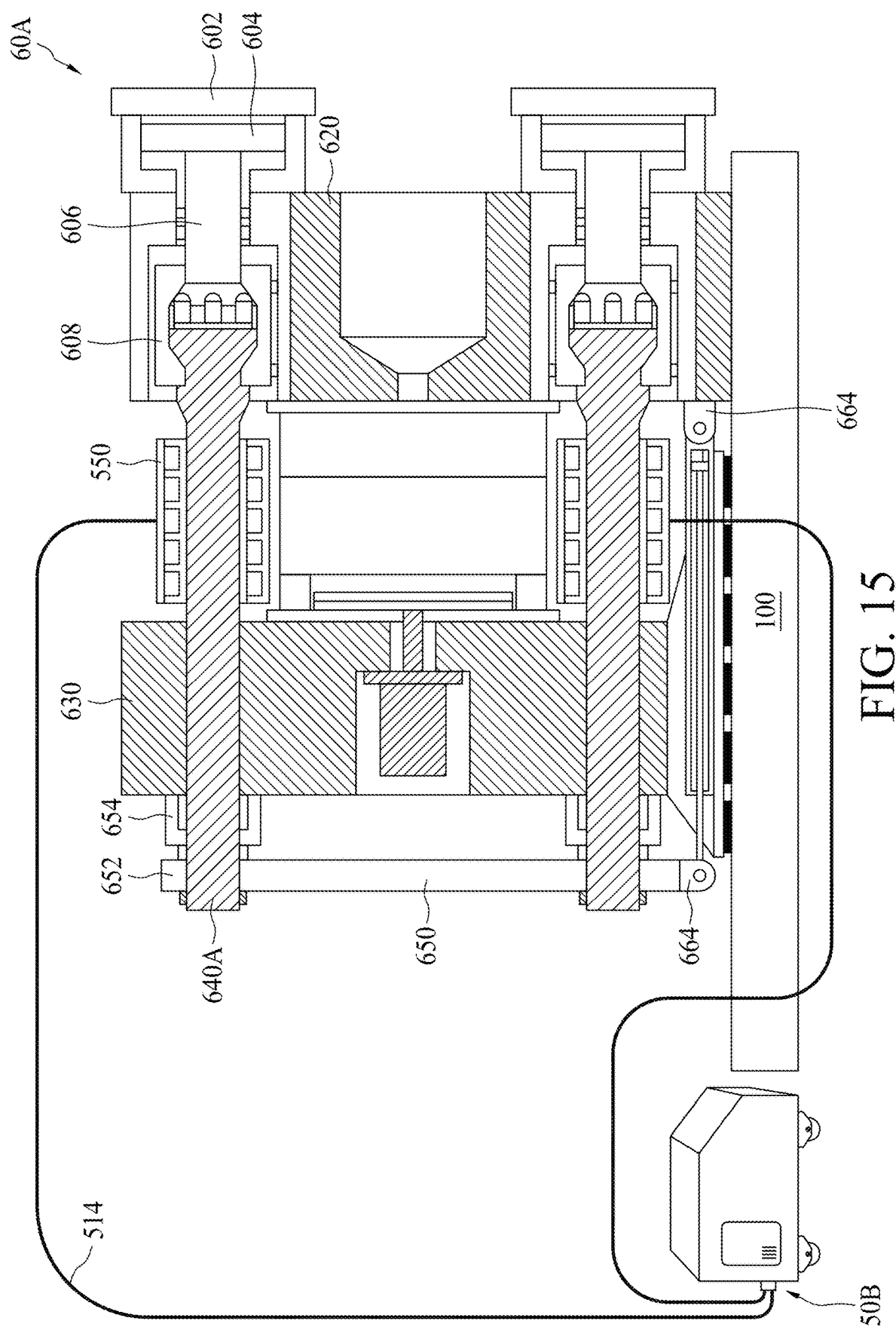

FIGS. 13 to 15 show various embodiments of the clamping assembly 40A, 60A. It should be noted that the clamping assembly 40A shown in FIGS. 13 and 14 contains many features that are same as or similar to features of the clamping assembly 40 disclosed with respect to FIGS. 2 and 3, and the clamping assembly 60A shown in FIG. 15 contains many features that are same as or similar to features of the clamping assembly 60 disclosed with respect to FIG. 7. For purposes of clarity and simplicity, details of same or similar features may be omitted, and the same or similar reference numbers denote the same or like components.

The main differences between the clamping assembly 40A shown in FIGS. 13 and 14 and the clamping assembly 40 shown in FIGS. 2 and 3 are described as follows.

Referring to FIGS. 13 and 14, the tie bars 440A are solid columns. In order to prevent the tie bars 440A from undergoing non-uniform thermal expansion, the temperature adjuster 50A includes a plurality of temperature-controlling modules 550 wrapped around portions of the tie bars 440A. In some embodiments, the temperature adjuster 50A may circulate a fluid (not shown) into the temperature-controlling modules 550 via pipes 514 to remove heat from the tie bars 440A. In alternative embodiments, the temperature-controlling modules 550, under control of the temperature adjuster 50A, may generate thermal energy to heat portions of the tie bars 440A to prevent the tie bars 440A from undergoing non-uniform thermal expansion, thus preventing the flash issue.

In the clamping assembly 40A, a length L of the temperature-controlling module 550 between the fixed plate 420 and the movable plate 430 is less than a minimum mold height, in order to prevent the extrusion of the temperature-controlling module 550 during the injection of the melted plastic. In addition, the temperature-controlling modules 550, between the rear plate 410 and the movable plate 430, do not exceed the range of a maximum mold height stroke X, thus preventing the respective temperature-controlling modules 550 from incurring damage.

Similarly, the tie bars 640A, shown in FIG. 15, are solid columns, such that the temperature adjuster 50B is provided with a plurality of temperature-controlling modules 550 to wrap around portions of the tie bars 640A, such that the non-uniform thermal expansion issue of the tie bars 640A can be effectively prevented.

In conclusion, with the configuration of the clamping assembly 40/40A/60/60A, the heat transferred from the fixed plate 420/620 and movable plate 430/630 to the tie bars 440/440A/640/640A is monitored and can be rapidly removed in order to prevent flash and wear issues.

One aspect of the present disclosure provides a clamping assembly. The clamping assembly, in operative connection with a mold of an injection-molding apparatus, comprises a fixed plate, a rear plate, a plurality of tie bars, a movable plate, a driving module, and a temperature adjuster. The rear plate is spaced apart from the fixed plate. The plurality of tie bars are interlinked with the fixed plate and the rear plate and are provided with a plurality of channels extending therethrough in a longitudinal direction. The movable plate is capable of moving with respect to the fixed plate along the tie bars. The driving module interlinks the rear plate and the movable plate. The temperature adjuster is employed to supply a fluid into the channels to remove heat from the tie bars.

One aspect of the present disclosure provides a clamping assembly. The clamping assembly, in operative connection with a mold of an injection-molding apparatus, comprises a plurality of driving modules, a fixed plate, a movable plate, at least one linkage, a plurality of tie bars, and a temperature adjuster. The movable plate is spaced apart from the fixed plate for mounting the driving modules. The linkage is mounted on the movable plate. The plurality of tie bars are interlinked with the driving modules and the linkage and penetrate through the movable plate, wherein at least one of the tie bars is provided with a hidden hole extending along its longitudinal direction. The temperature adjuster is employed to feed a fluid into the hidden hole to remove heat from the respective tie bar.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the present disclosure, processes, machines, manufacture, compositions of matter, means, methods or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods and steps.

What is claimed is:

1. A clamping assembly, in operative connection with a mold of an injection-molding apparatus, comprising:
    a fixed plate;
    a rear plate spaced apart from the fixed plate;
    a plurality of tie bars interlinked with the fixed plate and the rear plate and provided with a plurality of channels extending therethrough in a longitudinal direction;
    a movable plate capable of moving with respect to the fixed plate along the tie bars;
    a driving module interlinking the rear plate and the movable plate; and
    a temperature adjuster employed to supply a fluid into the channels to remove heat from the tie bars.

2. The clamping assembly of claim 1, wherein the temperature adjuster comprises:
    a processor;
    a pump electrically coupled to the processor;
    a reservoir for storing the fluid; and
    a plurality of pipes, wherein the channels through the tie bars, the reservoir and the pump are interlinked with each other through the pipes,
    wherein the pump supplies the fluid, a temperature of which is lower than temperatures of the tie bars, into the channels from the reservoir, thereby bringing the fluid into contact with the tie bars for the purpose of absorbing heat.

3. The clamping assembly of claim 2, wherein the temperature adjuster further comprises a plurality of coupling collars connecting intakes of the tie bars to the pipes communicating with the pump, and connecting outputs of the tie bars to the pipes communicating with the reservoir.

4. The clamping assembly of claim 2, wherein the temperature adjuster further comprises a plurality of first sensors attached to surfaces of the tie bars and electrically coupled to the processor to monitor temperatures of the tie bars, and the processor is programmed to adjust a flow rate of the fluid to be fed into the channels based on monitoring results.

5. The clamping assembly of claim 4, wherein the first sensors are further disposed in the pipes and near the outputs of the tie bars for monitoring temperatures of the fluid passing through the channels.

6. The clamping assembly of claim 4, wherein the temperature adjuster further comprises:
    at least one second sensor located in the reservoir and electrically coupled to the processor for monitoring a temperature of the fluid in the reservoir; and
    a temperature regulator disposed in the reservoir and electrically coupled to the processor,
    wherein the processor is programmed to analyze monitoring results provided by the second sensor and to control operations of the temperature regulator to change the temperature of the fluid in the reservoir based on the analyzed result.

7. The clamping assembly of claim 1, further comprising an ejection cylinder mounted in and extending through the movable plate and configured to push a molded product out of the mold, wherein the driving module is configured to exert a force on the movable plate for pushing the movable plate toward the fixed plate to perform a mold-closing operation and to pull the movable plate away from the fixed plate to perform a mold-opening operation.

8. The clamping assembly of claim 1, wherein the fluid enters the channels from a first end of the tie bar near the fixed plate and exits the channels from a second end near the rear plate.

9. The clamping assembly of claim 1, wherein the temperature adjuster further comprises a plurality of electric heaters attached to the fixed plate and the movable plate and electrically coupled to the processor.

10. A clamping assembly, in operative connection with a mold of an injection-molding apparatus, comprising:
    a plurality of driving modules;
    a fixed plate for mounting the driving modules;
    a movable plate spaced apart from the fixed plate;
    at least one linkage mounted on the movable plate;
    a plurality of tie bars interlinked with the driving modules and the linkage and penetrating through the movable plate, wherein at least one of the tie bars is provided with a hidden hole extending through the tie bar in a longitudinal direction; and
    a temperature adjuster employed to feed a fluid into the hidden hole to remove heat from the respective tie bar.

11. The clamping assembly of claim 10, wherein the temperature adjuster comprises:
    a processor;
    a pump electrically coupled to the processor;
    a reservoir containing the fluid;
    at least one conduit received in the hidden hole and having a first channel extending therethrough in a longitudinal direction, wherein an outer peripheral surface of the conduit and an inner peripheral surface of the respective tie bar collectively define a second channel communicating with the first channel; and
    a plurality of pipes, wherein the reservoir, the first channel, the second channel, the reservoir and the pump are interlinked with each other through the pipes,
    wherein the pump supplies the fluid, a temperature of which is lower than temperatures of the tie bars, into the first and second channels from the reservoir, thereby bringing the fluid into contact with the tie bars for absorbing heat from the tie bars.

12. The clamping assembly of claim 11, wherein the fluid flows from the second channel to the first channel.

13. The clamping assembly of claim 11, wherein the fluid flows from the first channel to the second channel.

14. The clamping assembly of claim 11, wherein the temperature adjuster further comprises at least one coupling collar for coupling the conduit and the respective tie bar to the pipes.

15. The clamping assembly of claim 10, wherein the coupling collar contacts an end surface of the tie bar while a portion of the conduit extends into the coupling collar, and end surface of the tie bar is configured to press against at least one O-ring, such that the O-ring wraps around a passageway of the coupling collars tightly.

16. The clamping assembly of claim 10, wherein the driving modules comprise:
a housing mounted on the fixed plate;
a piston received in the housing;
a rod connected to the piston;
a mortise lock connecting the tie bar to the rod; and
a bracket penetrating through the fixed plate and employed to position the rod and the mortise lock.

17. The clamping assembly of claim 16, wherein the mortise lock is housed in the bracket and comprises a main annulus and a plurality of annulus sectors, equiangularly spaced apart from each other, connected to an inner peripheral surface of the main annulus.

18. A clamping assembly, in operative connection with a mold of an injection-molding apparatus, comprising:
at least one driving module;
a fixed plate;
a rear plate spaced apart from the fixed plate;
a plurality of tie bars interlinked with the fixed plate and the rear plate;
a movable plate capable of moving wit respect to the fixed plate along the tie bars; and
a plurality of temperature-controlling modules wrapped around portions of the tie bars, between the fixed plate and the movable plate and between the rear plate and the movable plate, to adjust a temperature of the tie bars,
wherein a length of the temperature-controlling modules, between the rear plate and the movable plate, is less than a maximum mold height stroke.

19. The clamping assembly of claim 18, wherein a length of the temperature-controlling modules between the fixed plate and the movable plate is less than a minimum mold height.

20. The clamping assembly of claim 18, wherein the temperature adjuster circulates a fluid into the temperature-controlling modules via a plurality of pipes.

* * * * *